United States Patent [19]
Sasaki

[11] Patent Number: 5,216,218
[45] Date of Patent: Jun. 1, 1993

[54] CONTROL UNIT FOR ELECTRICAL DISCHARGE MACHINE

[75] Inventor: Shiro Sasaki, Aichi, Japan

[73] Assignee: Mitsubishi Denki K.K., Tokyo, Japan

[21] Appl. No.: 737,002

[22] Filed: Jul. 29, 1991

[30] Foreign Application Priority Data

Jul. 30, 1990 [JP] Japan ................................. 2-01668

[51] Int. Cl.⁵ ............................................ B23H 7/20
[52] U.S. Cl. .............................. 219/69.16; 219/69.13; 395/904
[58] Field of Search ............... 219/69.13, 69.16, 69.17, 219/69.19, 69.2; 364/513, 474.04; 395/10, 900, 904

[56] References Cited

U.S. PATENT DOCUMENTS

| | | | |
|---|---|---|---|
| 4,071,729 | 1/1978 | Bell, Jr. ............................. | 219/69.13 |
| 4,335,436 | 6/1982 | Inoue ................................ | 219/69.13 |
| 4,559,434 | 12/1985 | Kinoshita ......................... | 219/69.17 |
| 4,700,039 | 10/1987 | Konno et al. ..................... | 219/69.16 |
| 4,806,719 | 2/1989 | Seereider et al. ................. | 219/69.13 |
| 5,012,430 | 4/1991 | Sakurai ............................. | 364/513 |
| 5,117,083 | 5/1992 | Kawamura ........................ | 219/69.16 |

FOREIGN PATENT DOCUMENTS

| | | | |
|---|---|---|---|
| 62-10769 | 3/1987 | Japan . | |
| 63-62001 | 3/1988 | Japan . | |
| 2-303721 | 12/1990 | Japan ............................... | 219/69.13 |
| 8907503 | 8/1989 | PCT Int'l Appl. .............. | 219/69.13 |

Primary Examiner—Geoffrey S. Evans
Attorney, Agent, or Firm—Sughrue, Mion, Zinn, Macpeak & Seas

[57] ABSTRACT

An adaptive control unit for an electrical discharge machine having a movable electrode for machining a workpiece, the adaptive control unit including a processing circuit for detecting several machining conditions between a time when the movable electrode begins machining the workpiece and a time when the movable electrode is moved away from the workpiece, a first memory for storing the detected machining conditions, a second memory for storing information representing several rules for defining a changing a machining state; and a determination circuit for determining a value representing a machining instability condition in accordance with the machining conditions stored in the first memory, and the rules stored in the second storage means. The rules stored in the second memory include fuzzy set representations, and the second memory further stores membership functions for the fuzzy set representations.

20 Claims, 10 Drawing Sheets

FIG. 3

TECHNIQUE A1:   IF
           THE AMPLITUDE A OF THE ELECTRODE MOTION
           IS ALMOST ZERO, THE AMPLITUDE B IS SMALL,
           AND THE AMPLITUDE C IS LARGE,

THEN
           THE MACHINING STATE IS INSTABLE.

TECHNIQUE A2:   IF
           THE AMPLITUDE A OF THE ELECTRODE MOTION
           IS SMALL, THE AMPLITUDE B IS LARGE, AND
           THE AMPLITUDE C IS LARGE,

THEN
           THE MACHINING STATE IS EXTREMELY
           INSTABLE.

FIG. 8

TECHNIQUE B1: IF
> THE AMPLITUDE A OF THE ELECTRODE MOTION IS SMALL, THE AMPLITUDE B IS ALMOST ZERO, AND THE AMPLITUDE C IS ALMOST ZERO,

> THEN
>> REDUCE THE ELECTRODE RAISING/LOWERING SPEED SLIGHTLY.

TECHNIQUE B2: IF
> THE AMPLIITUDE A OF THE ELECTRODE MOTION IS LARGE, THE AMPLITUDE B IS SMALL, AND THE AMPLITUDE C IS ALMOST ZERO,

> THEN
>> REDUCE THE ELECTRODE RAISING/LOWERING SPEED EXTREMELY.

TECHNIQUE B3: IF
> THE AMPLITUDE A OF THE ELECTRODE MOTION IS SMALL, THE AMPLITUDE B IS SMALL, AND THE AMPLITUDE C IS SMALL,

> THEN
>> THE MACHINING STATE IS SLIGHTLY INSTABLE AND THE ELECTRODE RAISING/LOWERING SPEED SHOULD NOT BE CHANGED.

TECHNIQUE B2: IF
> THE AMPLITUDE A OF THE ELECTRODE MOTION IS LARGE, AND THE AMPLITUDE B IS LARGE, AND THE AMPLITUDE C IS LARGE,

> THEN
>> THE MACHINING STATE IS EXTREMELY INSTABLE AND THE ELECTRODE RAISING/LOWERING SPEED SHOULD NOT BE CHANGED.

CONTROL UNIT FOR ELECTRICAL DISCHARGE MACHINE

FIELD OF THE INVENTION

The present invention relates to an adaptive control unit for an electrical discharge machine.

BACKGROUND OF THE INVENTION

FIG. 10 shows the adaptive control unit for an electrical discharge machine disclosed in Japanese Patent Publication No. 10769/1987. This adaptive control unit includes a machining electrode 1, a workpiece 2, a machining tank 3 containing dielectric material 4, a spindle 5 for moving the machining electrode 1 in a vertical direction, e.g., a Z axis direction, a drive motor 6 for driving the spindle 5, and a speed/position detector 7 for detecting the speed and position of the spindle 5. The adaptive control unit further includes an electrode position control circuit 21 for providing a drive command to the drive motor 6 which controls the position of the machining electrode 1, a machining power supply circuit 22 for supplying a machining voltage across the machining electrode 1 and workpiece 2, a detected value processor 23, coupled to receive a detection signal from the position detector 7 and coupled to receive the machining gap voltage provided by the supply circuit 22, for providing the electrode position control area 21 and the machining power supply circuit 22 with feedback commands, and for providing an adaptive control circuit 31 with a command signal to raise a bottom point of the electrode 1, i.e., the point where the downward movement of the machining electrode 1 towards the workpiece 2 changes and the electrode is driven upward away from the workpiece, and for providing the machining power supply circuit 22 with a machining command.

The adaptive control area 31 provides the electrode position control circuit 21 and the machining power supply circuit 22 with machining commands to perform adaptive control in accordance with an output signal received from the detected value processor circuit 23.

The operation of the control unit shown in FIG. 10 will now be described.

When a pulse voltage is applied by the machining power supply circuit 22 between the machining electrode 1 and the workpiece 2, an electrical discharge occurs therebetween in the dielectric material 4. As a result of this electrical discharge, and of the feeding operation of the electrode 1, the workpiece 2 is machined. In order to maintain an appropriate gap for electrical discharge between the machining electrode 1 and the workpiece 2, the electrode position control area 21 compares an average machining gap voltage provided by the detected value processor circuit 23 with a reference voltage, and controls the drive motor 6 in accordance with the results of this comparison in order to control the position or feed rate of the machining electrode 1.

In electrical discharge machining, the gap between the machining electrode 1 and workpiece 2 is on the order of between ten microns or several tens of microns. When the area to be machined is relatively large, it is difficult for cuttings generated from the large machining area to be ejected through the machining gap, i.e., between electrode 1 and workpiece 2. If cuttings remain in the machining gap, then the electrical discharge will concentrate on that area, thereby resulting in a faulty electrical discharge condition. This faulty discharge condition occurs when the amount of cuttings from the workpiece has surpassed the ejection capability of the cuttings. The faulty discharge condition can be prevented by detecting or estimating when the faulty condition will occur, and then reducing the amount of cuttings or improving the ejection capability. The occurrence of the faulty discharge condition will now be described further in connection with FIGS. 11(a) and 11(b), each of which depicts the movement of the machining electrode 1.

FIG. 11(a) represents a normal machining operation, whereas FIG. 11(b) represents a faulty machining operation. During machining, the machining electrode 1 vibrates up and down by an amount between about ten microns and several tens of microns. As normal machining progresses, the bottom point 101 (FIG. 11(a)), i.e., the point where the falling machining electrode 1 begins to rise, gradually lowers. However, if a faulty condition occurs in the machining gap, the bottom point 101 starts to move upward, as shown in FIG. 11(b). In order to prevent the faulty condition, it is necessary to shorten the width of the current pulse supplied by the machining power supply circuit 22 or to prolong a discharge stop width in order to stem the rise of the bottom point 101 and minimize the amount of cuttings produced. Alternatively, it is necessary to increase the periodic raising height of the machining electrode 1, i.e., the height by which the electrode is periodically separated from the workpiece during electrical discharge machining, in order to improve the ejection capability of the machined cuttings. Increasing the raising frequency is also effective.

In FIG. 10, the detected value processor circuit 23 detects the bottom point 101 in accordance with the motion of the machining electrode 1 obtained from the position detector 7, and provides a signal to the adaptive control circuit 31 which indicates the rise or fall of the bottom point 101. When a detected rise of the bottom point 101 has exceeded a predetermined threshold value, the adaptive control area 31 determines that a fault has occurred in the machining gap, and in response to this fault determination controls the power supply circuit 22 and the electrode position control circuit 21 to shorten the current pulse width and to prolong the electrical discharge stop width in order to minimize the amount of cuttings produced. Alternatively, the adaptive control area circuit 31 commands the electrode position control circuit 21 and the machining power supply circuit 22 to increase the periodic electrode raising value in order to improve the ejection capability of the machined cuttings.

Consequently, according to the prior art device discussed above it is necessary to provide a control scheme for shortening the current pulse width or for increasing the periodic raising value of the machining electrode 1 in order to prevent a faulty electrical discharge. However, it is difficult to achieve such a control scheme using an accurate technique because the periodic electrode raising value simply increases when the rise of the bottom point has exceeded a predetermined threshold value. Specifically, a skilled operator of the control unit judges the instability of an electrical discharge condition from various motions of the machining electrode 1 and from data representing an electrical value across the machining electrode 1 and workpiece 2, and changes the electrical discharge width and periodic electrode raising value in accordance with the judged instability.

In controlling the current pulse width and periodic electrode raising value automatically in accordance with the instability of the electrical discharge machining condition, instead of using the control provided by a skilled operator, it is difficult to describe properly through electronics or software the judgment criteria of the skilled operator.

To solve the problem of accurately emulating the judgment provided by a skilled operator, an adaptive control unit for an electrical discharge machine was developed by the present applicant in Japanese Patent Application No. 189844/1988. According to this adaptive control unit, a storage area is provided wherein a technique for recognizing a machining state is stored. This technique detects a machining state using a detected value processor, stores that detected state in a state storage area, synthesizes a plurality of results provided by the technique from a knowledge storage area and the machining status from the status storage area, by means of an inferring area, to obtain the machining state or a value which is equivalent thereto, and defines a manipulated value using that state or value.

The adaptive control unit allows the techniques of the skilled operator or the judgment criteria, etc., of the operator as to machining condition changes and electrical discharge machining state instability to be described properly and easily. These techniques permit optimum machining conditions to be executed and adaptive change to be automatically made.

However, when the area to be machined is large, in addition to those unstable states described above, the machining state becomes instable for a short time when the machining electrode and workpiece approach each other and machining is started and thereafter the machining state may become stable or may remain instable until the machining electrode and workpiece are separated. This instability can be corrected by reducing the electrode raising/lowering speed, which decreased the efficiency of the electrical discharge machining. Presently, a skilled operator monitors the instability of the electrical discharge machining state and alters the operation in accordance with the monitored instability As described above, the prior art adaptive control unit for an electrical discharge machine detects a machining state value in a predetermined section, synthesizes a plurality of results from the detected machining state value and from techniques stored in a knowledge storage area in order to determine the electrical discharge machining state. However, with this adaptive control unit the instability of the electrical discharge machining state from when machining is initially started to when the electrode is separated from the workpiece cannot be properly determined. Further, the prior art adaptive control unit cannot properly determine if the unstable state occurs only momentarily at the beginning of machining. For this reason, even if the electrical discharge machining state improves after the beginning of machining, or if an unstable state occurs only momentarily, the machining state is recognized as instable, and adaptive control corresponding to the level of a skilled operator cannot be achieved. This is especially true when the area to be machined is large. Specifically, in the case of a large machining area, the control of the electrode raising/lowering speed, the electrical discharge stop/pulse, and the electrode raising value/lowering period, etc., cannot be easily differentiated if the machining conditions are controlled with the techniques of the prior art adaptive control unit.

SUMMARY OF THE INVENTION

It is therefore an object of the present invention to overcome the problems attendant with the prior art control units by providing an adaptive control unit for an electrical discharge machine which detects an instable state of an electrical discharge machine in a plurality of time segments between when machining is initially started and when the machining electrode and the workpiece are separated from each other.

It is another object of the invention for the techniques employed by a skilled operator for judging electrical discharge machining state instability to be accurately emulated, and for optimum machining control and adaptive change to be automatically performed by such techniques.

It is still another object of the invention to provide an adaptive control unit for an electrical discharge machine which permits techniques for differentiating between the control of electrode raising/lowering speed, electrical discharge stop/pulse, electrode raising value/electrode lowering period, etc., to be described, and for such controls to be accurately differentiated.

These and other objects of the invention are achieved by an adaptive control unit for an electrical discharge machine according to the present invention which includes a knowledge storage area or memory for storing a plurality of techniques for controlling a machining condition controlling means to change the machining state, a status storage area or memory for storing a machining state and machining conditions deteoted by a detected value processor circuit, and an inferring area circuit for determining the machining state or a value equivalent thereto by synthesizing a plurality of results in order to obtain machining conditions for achieving a desired machining state.

An adaptive control unit for an electrical discharge machine according to another embodiment of the present invention includes machining condition controlling means for inferring a machining state in accordance with a plurality of results obtained from techniques stored in the knowledge storage area, which techniques are effective for the execution of control by differentiating between electrode raising/lowering speed control and avoidance controls such as stop/pulse control and electrode raising value/lowering period control, and from the machining state detected by the detected value processor, and for achieving the desired machining conditions by differentiating between the electrode raising/lowering speed control and avoidance controls, in accordance with the results of the obtained inferenoe.

In aocordance with the present invention, techniques effective for controlling machining conditions are stored in tlie knowledge storage area, a plurality of machining state values in a plurality of sections defined as required for the techniques are detected by the detecting means in the detected value processor and stored in the status storage area, and a plurality of results obtained by the techniques from the knowledge storage area and the machining state values from the status storage area are synthesized by the inferring area to execute optimum control over the machining conditions.

In addition, techniques effective for the execution of control by differentiating electrode raising/lowering speed control and avoidance Control, e.g., stop/pulse control, electrode raising value/lowering period control, etc., are stored in the knowledge storage area, a plurality of results obtained from the processes and machining state values detected in a plurality of sections are synthesized by the inferring means, and the machining conditions are controlled by differentiating between electrode raising/lowering speed control and avoidance control.

BRIEF DESCRIPTION OF THE DRAWINGS

FIG. 3 shows various techniques for changing the instability of a machining state, described using a rule represented by fuzzy sets.

FIG. 8 illustrates an example of techniques effective for controlling electrode raising/lowering speed described using a rule represented by fuzzy sets.

DESCRIPTION OF THE PREFERRED EMBODIMENTS

Figure 1:
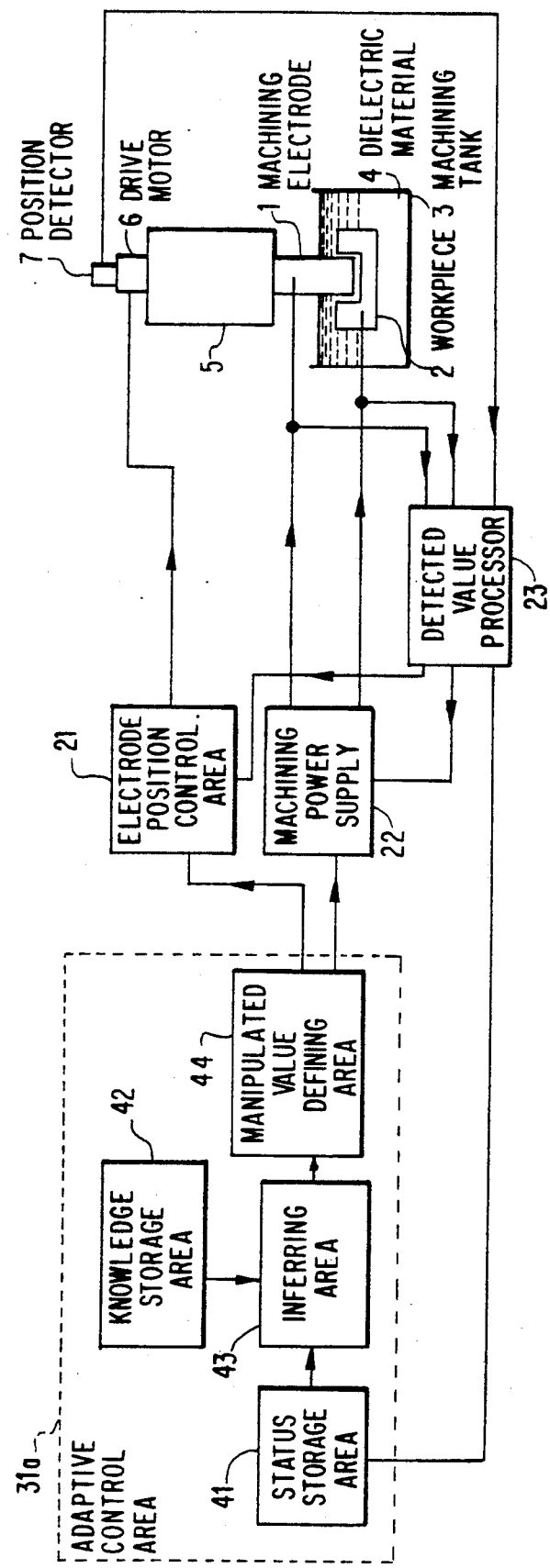
FIG. 1 is a block diagram illustrating one embodiment of the present invention.
Figure 10:
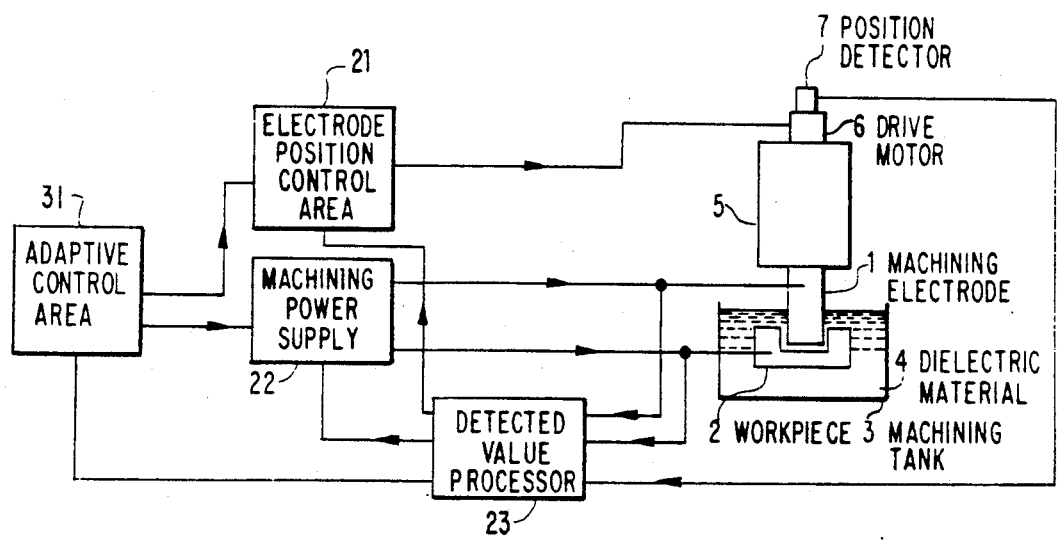
FIG. 10 is a block diagram of a known adaptive control unit for an electrical discharge machine.
Figure 11A:
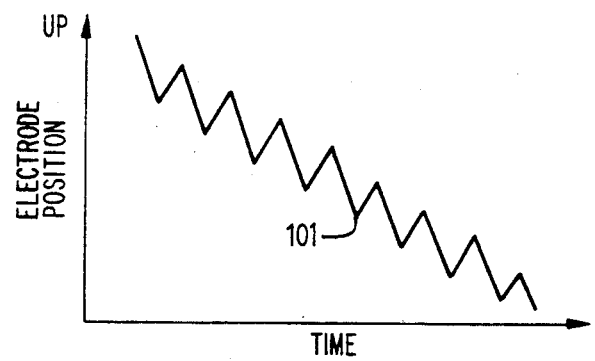
FIGS. 11(a) and 11(b) are graphs representing the motion of a machining electrode.
Figure 11B:
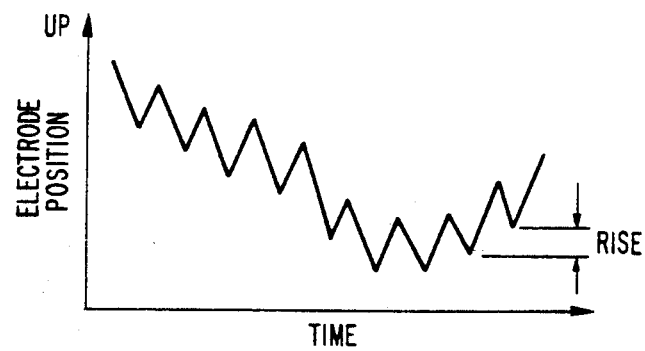

FIG. 1 is a block diagram showing a first embodiment of an adaptive control unit for an electrical discharge machine according to the present invention. In FIG. 1, like reference numerals as in FIG. 10 represent like elements.

As shown in FIG. 1, the control unit includes an adaptive control area 31a for changing a control command so that the electrical discharge machine is brought into an optimum machining state according to changes in machining conditions and machining states. The adaptive control area 31a includes a status storage area or memory 41 for storing current and past machining states and machining conditions which have been processed by the detected value processor 23, a knowledge storage area or memory 42 for storing a plurality of techniques or rules for changing the machining state, an inferring area 43 for synthesizing a plurality of machining states and machining conditions stored in the status storage area 41 according to the techniques or rules stored in the knowledge storage area 42 in order to determine machining conditions for achieving a desired machining state, and a manipulated value defining circuit 44 for controlling the Operation of the electrode position control circuit 21 and the machining power supply circuit 22 to effect the desired machining state determined by the inferring area circuit 43.

The operation of the adaptive control unit shown in o FIG. 1 will now be described.

Figure 4:
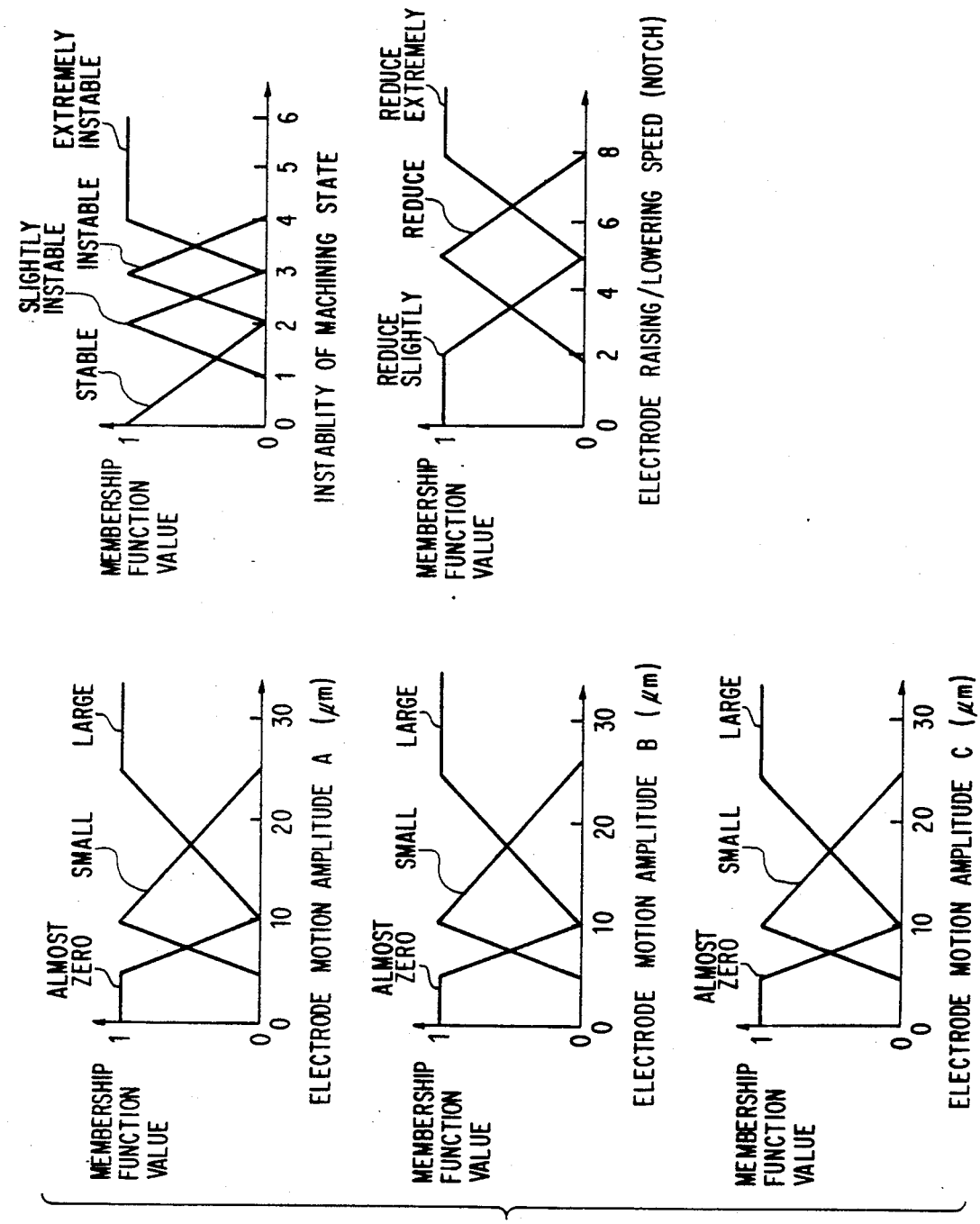
FIG. 4 shows membership functions for the fuzzy sets of FIG. 3.
Figure 5:
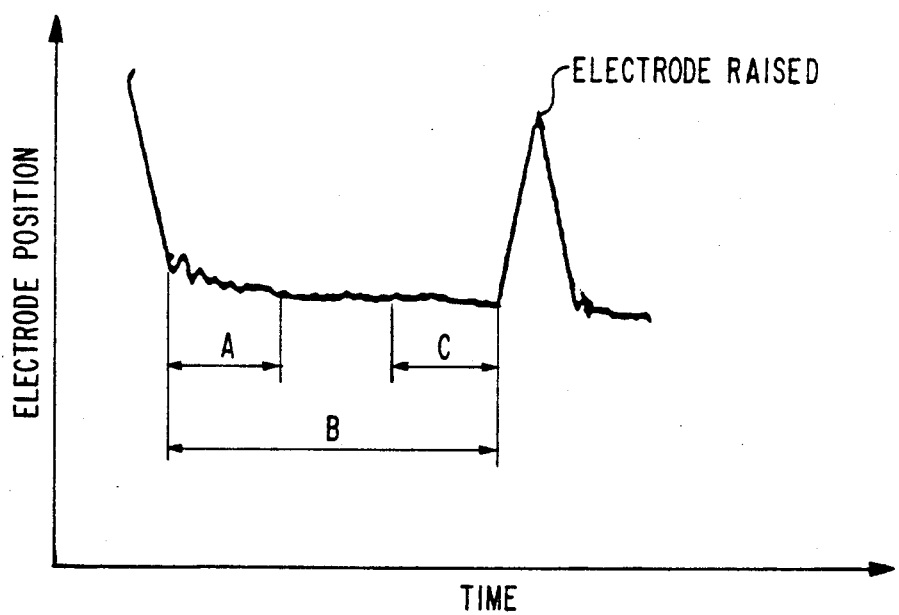
FIG. 5 shows various sections of an electrode position graph for detecting machining status.

FIG. 3 provides an example of various techniques or rules for judging and reacting to instability of th machining state. The knowledge storage area 42 stores several techniques represented in FIG. 3 (see also FIG. 8) in an "IF ... THEN," rule format, i.e., "IF (a certain condition is true), THEN (do thus-and-such)". For example, technique A1 is described according to a rule employing a fuzzy set which allows qualitative representation, e.g., "If the amplitude A of the electrode motion is almost zero, the amplitude B of the electrode motion is small, and the amplitude C of the electrode motion is large, then the machining state is instable." When technique A1 is valid or true, membership functions, shown in FIG. 4, are used to handle qualitative, fuzzy representations such as "large" and "small". FIG. 5 shows the time intervals represented by A, B and C.

A fuzzy set for "small" is represented by a membership function "small" as shown in FIG. 4. For example, if the amplitude of the electrode motion is 10 $\mu$m, the value of the membership function is 1, and if the amplitude of the electrode motion is 7.5 $\mu$m, then the membership function value is 0.5. The membership function value of 1 indicates that the function completely belongs to the set (here, the set of "small amplitudes"), and a membership function value of 0 indicates that the function does not belong to the set at all. For a more general explanation of the fuzzy logic process, the reader is referred to co-assigned application No. 602,535, the contents of which are incorporated herein by reference.

Figure 2:
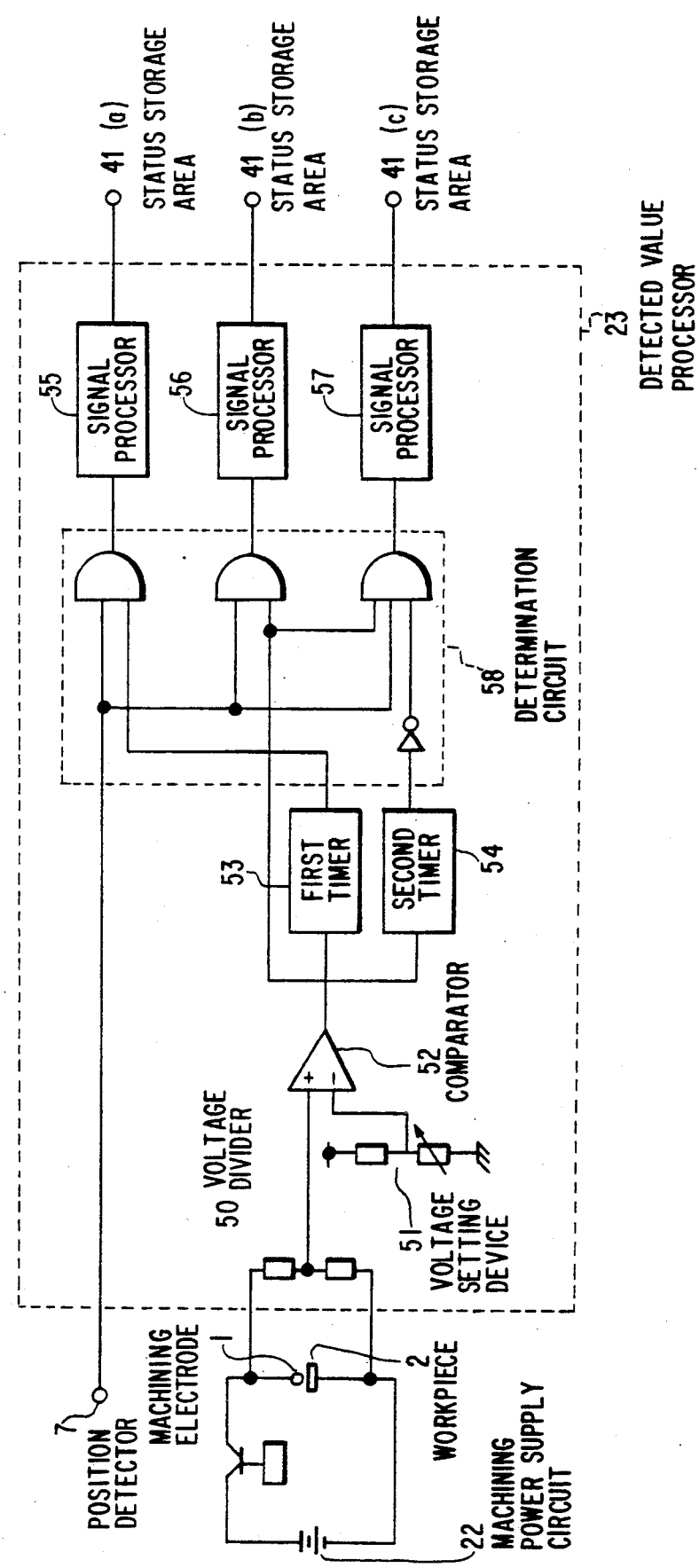
FIG. 2 is a block diagram showign in more detail the detected value processor shown in FIG. 1.

To use the techniques shown in FIG. 3, it is necessary to obtain the electrode motion amplitudes in the three periods A, B and C shown in FIG. 5. Specifically, as shown in FIG. 5, section A is that period defined from when machining is started between electrode 1 and workpiece 4 to when a predetermined time t has elapsed, section C is the period defined from a point after the desired time t has elapsed to the point where the electrode 1 and workpiece 4 are separated from each other, and section B is the total period from the beginning of section A to the end of section C. The electrode motion amplitudes obtained in sections A, B and C are amplitudes a, b and c, respectively. An example of obtaining these amplitudes is illustrated in FIG. 2 which shows the detected value processor 23 of FIG. 1 in greater detail.

Whether or not machining has started between electrode 1 and workpiece 2 is determined by a voltage divider 50, a voltage setting device 51 and a comparator 52. The voltage across the machining electrode 1 and workpiece 2 is detected by the voltage divider 50 and this detected voltage is provided to the comparator 51. The comparator 52 compares the detected voltage from the voltage divider 50 with a voltage value set by the voltage setting device 51 which provides, for example, a voltage value equal to 40 V or less. When the voltage value detected by the voltage divider 50 is equal to or less than 40 V, a determination circuit 58 provides an output signal. A first timer 53 is designed so as only to provide an output for a period of t1 seconds after the comparator 52 is operated.

A second timer 54 is designed so as only to provide an output for a period of t2 seconds after the comparator 52 is operated, and this output is input to the determination circuit 58. The position of the machining electrode 1 from the position detector 7 is also input to the determination circuit 58. In accordance with the operation of the comparator 52, the outputs of the first timer 53 and the second timer 54, and the inputs to the determination circuit 58, the amplitudes of the electrode motion, i.e., the amplitude values in section A of FIG. 5, are determined by signal processor 55, the amplitudes in section B by signal processor 56, and the amplitudes in section C by processor 57. The position of the machining electrode 1 is sampled by the signal processors 55, 56 and 57 every predetermined period of time, for example, 15 msec., and the obtained amplitude values per sample are operated on.

The status storage area 41 stores machining status values, i.e., the amplitudes a, b and c detected by the signal processor 23, required for the techniques stored in the knowledge storage area 42.

Figure 6:
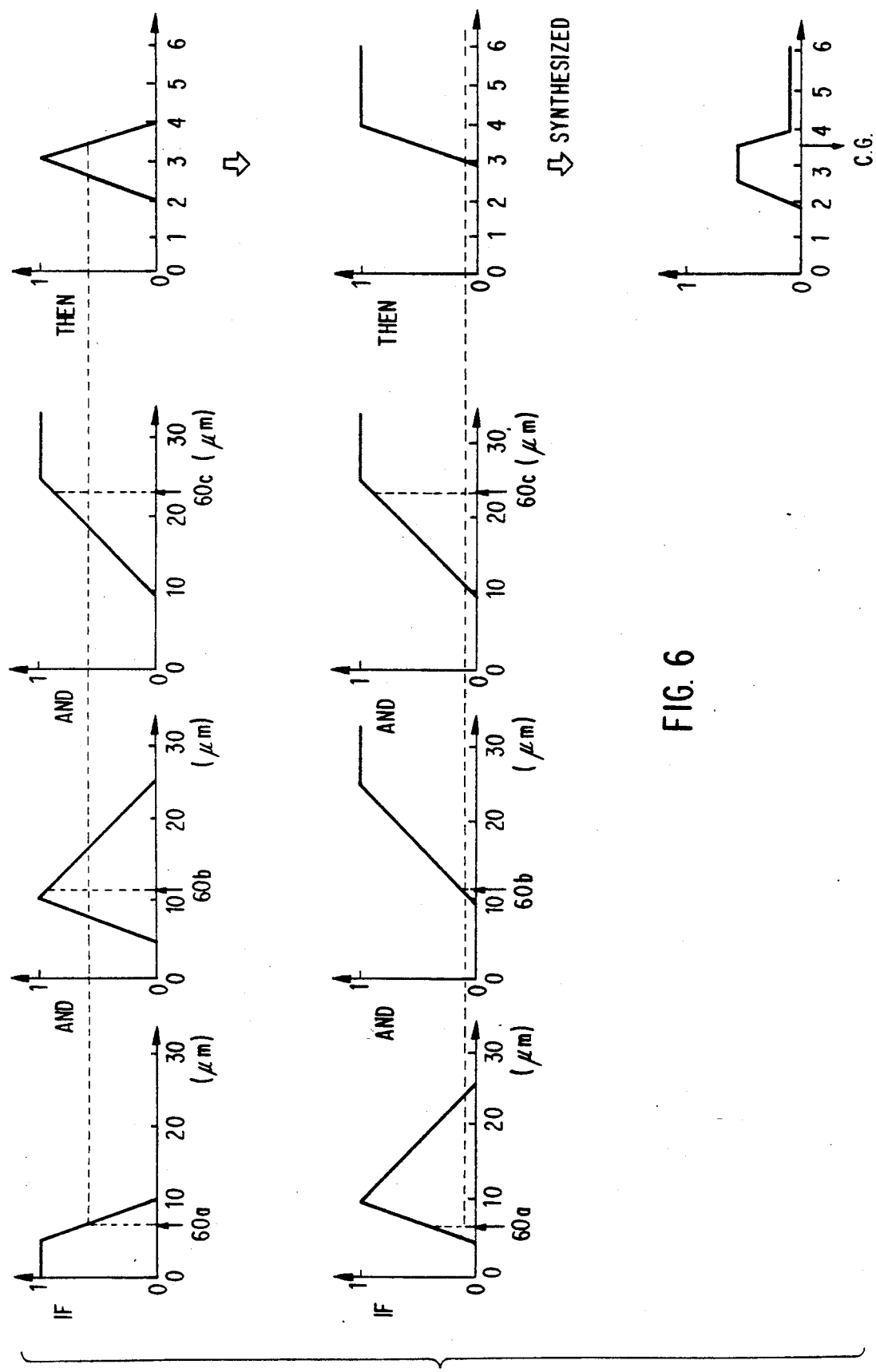
FIG. 6 shows a process of fuzzy inference by the techniques shown in FIG. 3.

In accordance with the procedure shown in FIG. 6, the inferring area 43 performs fuzzy inference in accordance with the techniques stored in the knowledge storage area 42 and the machining status values stored in the status storage area 41 in order to define and control the machining state instability. In FIG. 6, reference numerals 60a, 60b and 60c indicate the detected values of "amplitude a of the electrode motion," "amplitude b of the electrode motion" and "amplitude c of the electrode motion", respectively, stored in the status storage area 41. Average amplitudes during the respective periods may be used for this purpose.

In each of the techniques A1 and A2 for fuzzy inference, to what degree the status values satisfy the qualitative fuzzy representation of the "IF" portion described by the membership functions is examined, the upper limit of the membership function of the "THEN" portion is set to the least satisfactory membership function value (detected value 60a in the technique A1, 60b in the technique A2) in the IF portion, the THEN membership functions are then synthesized in order to always have the largest function value among the membership functions, and the center of gravity of the synthesized membership function area, C.G., is obtained. This C.G. value is the command value used to determine machining state instability.

Figure 7:
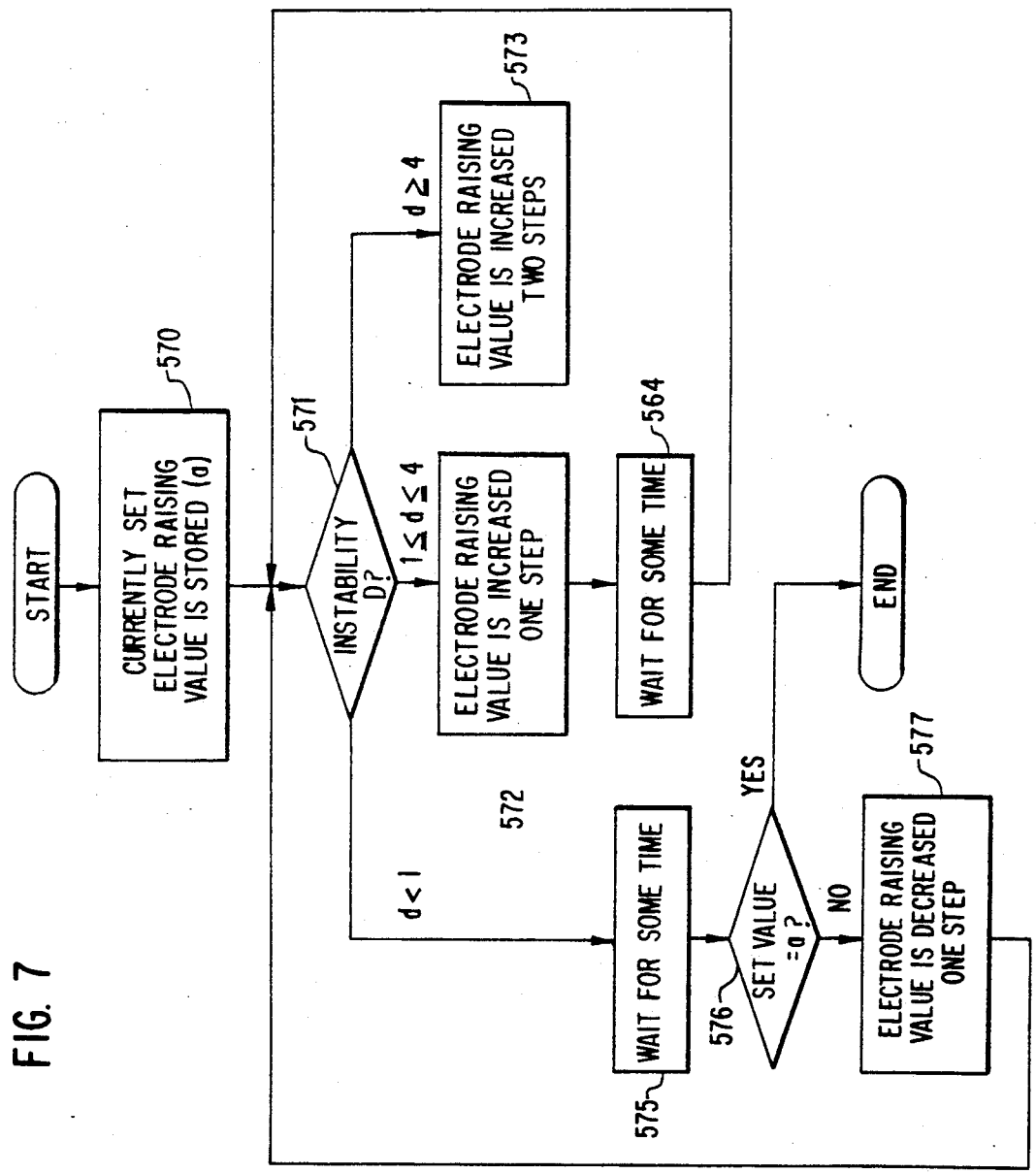
FIG. 7 is a flow chart for obtaining the increase or decrease in electrode raising value.

In accordance with the command value C.G. of machining state instability, the manipulated value defining area 44 outputs a command to change the machining condition. An example of the operation of the manipulated value defining area 44 is shown in FIG. 7 which is a flow chart illustrating a sample sequence for defining the increase and decrease in the electrode raising value in accordance with the instability obtained.

First, when the instability of the electrical discharge machining state is recognized, the currently set electrode raising value is stored (step S70). Namely, the electrical discharge machining state is recognized as instable and the electrode raising value prior to the change of the machining condition is stored (the electrode raising value stored is a). The increase or decrease in electrode raising value is defined in accordance with the recognized instability d (steps S71 to S73).

For example, if the instability, i.e., C.G., represented by the value d is $1 \leq d \leq 4$, the electrode raising value is increased one step (step S72). After the electrode raising value has been defined, there is a short waiting time (step S64) and the instability of the electrical discharge machining state is then checked again. The short waiting time is about three to four electrode raising periods and may be represented in terms of a time period. The waiting time is provided only to observe the electrical discharge machining state after the machining condition has been changed. In contrast, if the instability d is $d < 1$, a short waiting time is provided (step S75), and the current electrode raising value is compared with the previous electrode raising value (step (S76)). If they are not equal, the electrode raising value is reduced by one step (step S77). The increase or decrease in electrode raising value is thus defined and output to the electrode position control area 21.

As described above, complicated adaptive control can be achieved because the machining condition is defined in accordance with the recognition of the instability of the electrical discharge machining state according to a plurality of fuzzy techniques, and obtaining the electrical discharge machining state by synthesizing a plurality of results.

To achieve precision adaptive control (adaptive control closer to that of a skilled operator), the present invention may be improved to configure an adaptive control unit for an electrical discharge machine wherein the knowledge storage area 42 stores techniques effective for the execution of control by differentiating between the electrode raising/lowering speed control and the avoidance control, such as the stop/pulse control and electrode raising value/lowering period control, using fuzzy inference.

FIG. 8 shows an embodiment of the invention which is a technique effective for controlling the electrode raising/lowering speed.

As in the first embodiment, the knowledge storage area 42 stores techniques described in an "IF . . . THEN" format. For example, technique B1 is described according to a rule employing a fuzzy set which allows qualitative representation, e.g., "If the amplitude a of the electrode motion is small, the amplitude b of the electrode motion is almost zero, and the amplitude c of the electrode motion is almost zero, then slightly reduce the electrode raising/lowering speed". The membership functions shown in FIG. 4 are used to handle qualitative, fuzzy representations such as "large" and "small".

Figure 9:
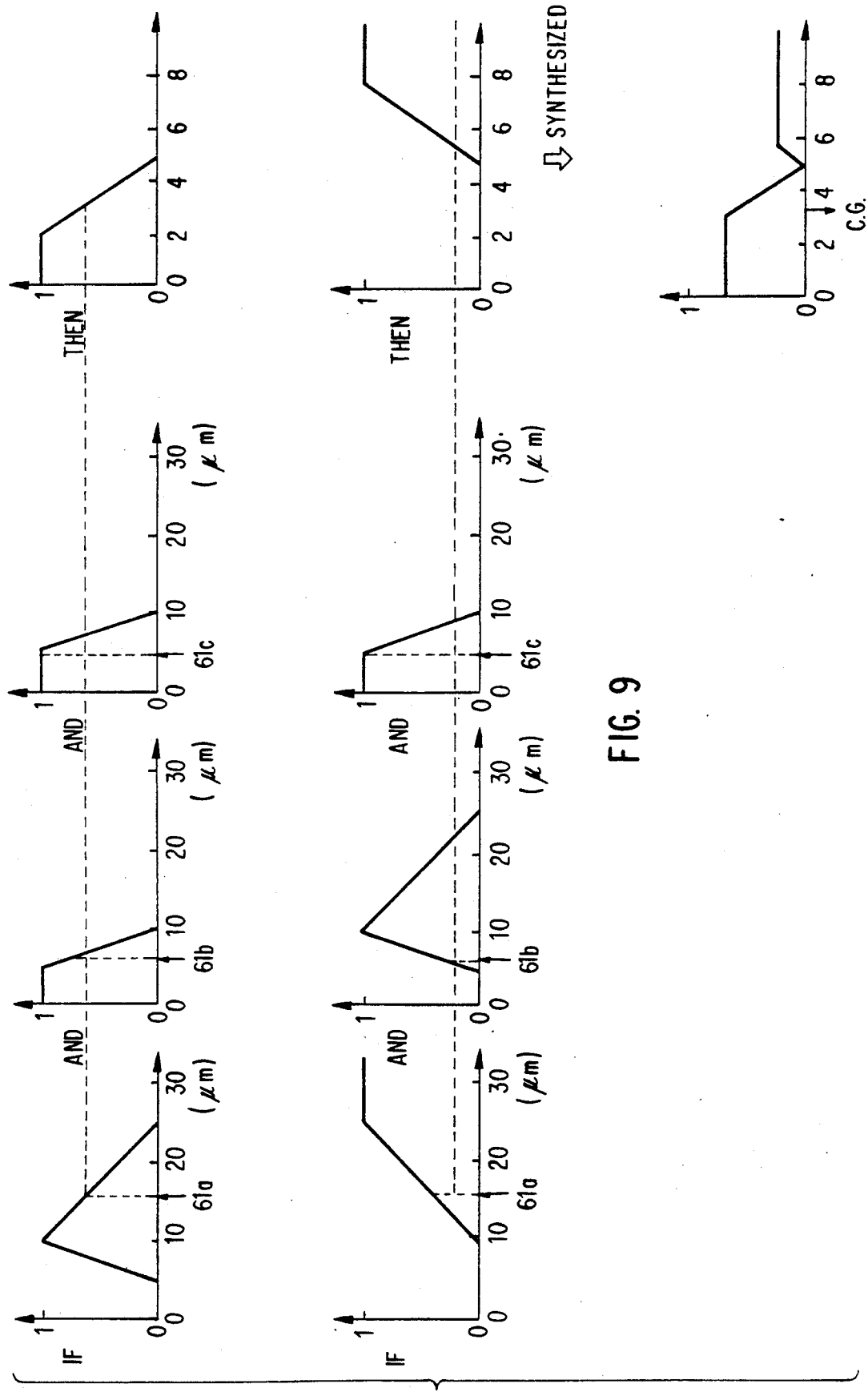
FIG. 9 illustrates a process of fuzzy inference by the techniques shown in FIG. 8.

When the techniques shown in FIG. 8 are employed, the inferring area 43 performs fuzzy inference according to the procedure shown in FIG. 9, the techniques stored in the knowledge storage area 42 and the machining status values stored in the status storage area 41 in order to define the command value of electrode raising/lowering speed. In FIG. 9, reference numerals 61a, 61b and 61c represent the detected values of "amplitude a of the electrode motion", "amplitude b of the electrode motion" and "amplitude c of the electrode motion", respectively. As in the first embodiment, these values are stored in the status storage area 41.

The method of synthesizing the membership functions according to the fuzzy inference is as described previously. That is, the center of gravity of the synthesized THEN membership function area C.G. is the command value. In accordance with this command value C.G., the manipulated value defining area 44 outputs a command to the electrode position control area 21 to change the electrode raising/lowering speed. In addition to the techniques B1 and B2, techniques B3 and B4 are also stored in the knowledge storage area 42. When these techniques are made valid or true, the instability of the electrical discharge machining state is obtained by fuzzy inference as described above, to change (or not change, as the case may be) the machining conditions such as the electrode raising value.

As described above, when the techniques A1 and A2 are made valid, the electrode raising/lowering speed is controlled, and when the techniques B1 and B2 are made valid, other parameters such as the stop/pulse, electrode raising value/lowering period, etc., are controlled.

To achieve a higher-level and a more complicated adaptive control, machining conditions such as the width, stop time and peak value of the current pulse and the electrode raising period, may be controlled using techniques described in the knowledge storage area 42. The electrode position raising value, the progress of the electrode position, the ratio of no-load time distribution density variation, the voltage rise time, the degree of short-circuit current occurrence, etc., may be used as the defining parameter in addition to the techniques A1, etc., described above which define instability of the machining state using the amplitude of the electrode motion.

Further, the machining state values stored in the status storage area 41 for the sections A-C may be automatically detected seVeral times, the detected values averaged, and the obtained average value stored in the status storage area 41 for use in the fuzzy inference operation to produce a similar effect.

In the above embodiments, one machining state is described in the first portion, i.e., the "IF" portion, of the technique or rule and the instability of machining is described in the second portion, i.e., the "THEN" portion of the technique. However, several different machining states may be described in these portions, as those skilled in the art will understand that the command value can be obtained in a similar manner if the number of techniques increases. In addition, changes in parameters for the machining conditions, such as the optimum electrode raising value, may be provided in a similar manner according to the fuzzy inference in accordance with the amplitude of the electrode motion.

In the above embodiments, the voltage divider 50, voltage setting device 51 and comparator 52 are employed for determining whether or not machining is started in accordance with the level of the electrical discharge voltage value. However, these elements may be replaced with any circuitry that can determine whether or not machining has begun.

It will be apparent that the invention, as described above, provides an adaptive control unit for an electrical discharge machine which allows machining state values in a plurality of time sections to be measured and used as defining parameters in fuzzy techniques described in a knowledge storage area, and the instability of the electrical discharge machining state to be defined by an inferring circuit in accordance with the detected state values and the stored techniques. Therefore, a transition from stability to instability or vice-versa in these sections, or instability occurring only in the initial section or occurring only momentarily, etc., can be discriminated, thereby allowing controlled changes in machining conditions (e.g., an electrode raising value, the width, stop time, and peak value of a current pulse, and an electrode raising period) which approximate the control provided by a skilled operator. Further, the machining conditions can be automatically controlled, with the electrode raising/lowering speed control and the avoidance control, such as the stop/pulse control and electrode raising value/lowering period control, being differentiated from each other.

What is claimed is:

1. An adaptive control unit for an electrical discharge machine including a movable electrode for machining a workpiece, said control unit comprising:

processing means (23), coupled to the electrical discharge machine, for detecting a machining condition during a plurality of different time periods, each of the different time periods occurring between a time when the movable electrode begins machining the workpiece and a time when the movable electrode is moved away from the workpiece;

first storage means (41) for storing the machining conditions detected by said processing means;

second storage means (42) for storing information representing a plurality of rules for determining or changing a machining state; and determination means (43) for determining a value representing a machining instability condition in for each of the plurality of different time periods according to the machining conditions stored in the first storage means, and the rules stored in the second storage means.

2. The adaptive control unit as defined in claim 1, further comprising control means (44) for controlling the electrical discharge machine in accordance with the machining instability conditions determined by said determination means.

3. The adaptive control unit as defined in claim 2, wherein said control means includes means for providing a value representing the machining instability condition, comparing means for comparing the provided value with a plurality of different ranges, and wherein said control means controls the electrical discharge machine in accordance with a result of said comparing means.

4. The adaptive control unit as defined in claim 1, wherein the plurality of rules stored ins aid second storage means includes fuzzy set representations, and wherein said second storage means further stores membership functions for the fuzzy set representations.

5. The adaptive control unit as defined in claim 4, wherein the plurality of rules stored in said second storage means are of an IF-THEN format.

6. The adaptive control unit as defined in claim 1, wherein said processing means includes first means for detecting machining conditions only during a predetermined time after the movable electrode has begun machining the workpiece.

7. The adaptive control unit as defined in claim 1, wherein said processing means includes second means for detecting machining conditions only during a period between a time after said first means stops detecting machining conditions and the time when the movable electrode is moved away from the workpiece.

8. The adaptive control unit as defined in claim 7, wherein said processing means includes third means for detecting machining conditions between the time the movable electrode begins machining the workpiece and the time the movable electrode is moved away from the workpiece.

9. The adaptive control unit as defined in claim 8, wherein the machining conditions detected by said first, second and third means are amplitudes representing movement by the movable electrode.

10. The adaptive control unit as defined in claim 1, wherein the machining conditiosn detected by said processing means are amplitudes representing movements of the electrode.

11. An adaptive control unit for an electrical discharge machine including an electrode for machining a workpiece and electrode control means for moving the electrode relative to the workpiece, said control unit comprising:

processing means (23), coupled to the electrical discharge machine, for detecting a machining condition during a plurality of different time periods, each of the different time periods occurring between a time when the electrode control means controls the electrode to begin machining the workpiece and a time when the electrode control means controls the electrode to move away from the workpiece;

first storage means (41) for storing the machining conditions detected by said processing means;

second storage means (42) for storing information representing a plurality of rules for controlling the electrode cotnrol means and determination means (43) for determining a value representing a machining instability condition for each of the different time periods according to the machining conditions stored in the first storage means, and the rules stored in the second storage means.

12. The adaptive control unit as defined in claim 11, further comprising control means (44) for controlling the electrode control means in accordance with the machining instability conditions determined by said determination means.

13. The adaptive control unit as defined in claim 11, wherein the plurality of rules stored in said second storage means includes fuzzy set representations, and wherein said second storage means further stores membership functions for the fuzzy set representations.

14. The adaptive control unit as defined in claim 13, wherein the plurality of rules stored in said second storage means are of an IF-THEN format.

15. The adaptive control unit as defined in claim 11, wherein said electrode control means controls an electrode raising/lowering speed relative to the workpiece.

16. An adaptive control unit for an electrical discharge machine includign a movable electrode for machining a workpiece, and electrical discharge control means for applying a voltage across the movable electrode and the workpiece, said control means comprising:

processing means (23), coupled to the electrical discharge machine, for detecting a machining condition during a plurality of different time periods, each of the different time periods occurring between a time when the movable electrode begins machining the workpiece and a time when the movable electrode moves away from the workpiece;

first storage means (41) for storing the machining conditions detected by said processing means;

second storage means (42) for storing information representing a plurality of rules for controlling the electrical discharge means; and determination means (43) for determining a value representing a machining instability condition for each of the different time periods according to the machining conditions stored in the first storage means, and the rules stored in the second storage means.

17. The adaptive control unit as defined in claim 16, further comprisign control means (44) for controlling the electrical discharge control means in accordance with the machining instability conditions determined by said determination means.

18. The adaptive control unit as defined in claim 16, wherein the plurality of rules stored in said second storage means includes fuzzy set representations, and wherein said second storage means further stores membership functions for the fuzzy set representations.

19. The adaptive control unit as defined in claim 18, wherein the plurality of rules stored in said second storage means are of an IF-THEN format.

20. The adaptive control unit as defined in claim 16, wherein said plurality of rules stored in said second storage means includes a rules for electrode raising/lowering speed control.

* * * * *